US008643211B2

(12) United States Patent
Meckes et al.

(10) Patent No.: US 8,643,211 B2
(45) Date of Patent: Feb. 4, 2014

(54) ARRANGEMENT OF AT LEAST ONE PERSONAL SERVICE UNIT IN A VEHICLE

(75) Inventors: Rüdiger Meckes, Berkenthin (DE); Hasso Weinmann, Lübeck (DE)

(73) Assignee: B/E Aerospace Systems GmbH, Lübeck (DE)

( * ) Notice: Subject to any disclaimer, the term of this patent is extended or adjusted under 35 U.S.C. 154(b) by 861 days.

(21) Appl. No.: 12/520,605

(22) PCT Filed: Dec. 21, 2007

(86) PCT No.: PCT/EP2007/011310
§ 371 (c)(1),
(2), (4) Date: Nov. 24, 2009

(87) PCT Pub. No.: WO2008/077598
PCT Pub. Date: Jul. 3, 2008

(65) Prior Publication Data
US 2010/0096919 A1   Apr. 22, 2010

(30) Foreign Application Priority Data
Dec. 23, 2006   (DE) .......................... 10 2006 061 455

(51) Int. Cl.
*B60L 1/00*   (2006.01)
(52) U.S. Cl.
USPC ............................................. 307/9.1; 307/11
(58) Field of Classification Search
USPC ......................................................... 307/9.1
See application file for complete search history.

(56) References Cited

U.S. PATENT DOCUMENTS

| 4,763,360 A | 8/1988 | Daniels et al. |
| 4,866,515 A | 9/1989 | Tagawa et al. |
| 5,025,355 A * | 6/1991 | Harwood ....................... 362/147 |
| 5,302,065 A | 4/1994 | Vogg et al. |
| 5,549,258 A | 8/1996 | Hart et al. |
| 5,651,733 A * | 7/1997 | Schumacher ................... 454/76 |
| 5,803,062 A | 9/1998 | Aulgur |
| 5,984,415 A | 11/1999 | Schumacher et al. |
| 6,393,343 B1 * | 5/2002 | Frey et al. ......................... 701/3 |
| 7,083,437 B2 * | 8/2006 | Mackness ....................... 439/110 |
| 8,166,506 B2 * | 4/2012 | Callahan et al. ................ 725/76 |
| 2005/0211835 A1 | 9/2005 | Henley et al. |
| 2006/0032979 A1 | 2/2006 | Mitchell et al. |
| 2006/0113810 A1 * | 6/2006 | Kuhl et al. ................. 296/24.34 |
| 2007/0057121 A1 | 3/2007 | Callahan et al. |
| 2007/0057122 A1 | 3/2007 | Lee et al. |
| 2007/0057576 A1 | 3/2007 | Lee |

FOREIGN PATENT DOCUMENTS

| DE | 34 16 143 A1 | 11/1985 |
| DE | 195 02 658 | 3/1996 |
| EP | 0 607 602 A1 | 7/1994 |
| EP | 1 338 507 A3 | 8/2003 |
| EP | 1 600 375 | 11/2005 |

(Continued)

*Primary Examiner* — Rexford Barnie
*Assistant Examiner* — Toan Vu
(74) *Attorney, Agent, or Firm* — McGlew and Tuttle, P.C.

(57) ABSTRACT

An arrangement of at least one personal service unit in a vehicle. At least one rail is arranged on the vehicle side. The rail includes at least one lead. The personal service unit includes at least one electricity collector which is arranged in a manner such that the electricity collector conductively contacts the at least one lead of the rail in the installed condition of the personal service unit in the vehicle.

19 Claims, 2 Drawing Sheets

(56) References Cited

FOREIGN PATENT DOCUMENTS

| EP | 1 803 645 | 7/2007 |
| JP | 2000-510786 A | 8/2000 |
| JP | 2002-072916 A | 3/2002 |
| JP | 2002-155678 A | 5/2002 |
| JP | 2005-263214 A | 9/2005 |
| WO | 97/43178 | 11/1997 |
| WO | WO 97/43178 | 11/1997 |

* cited by examiner

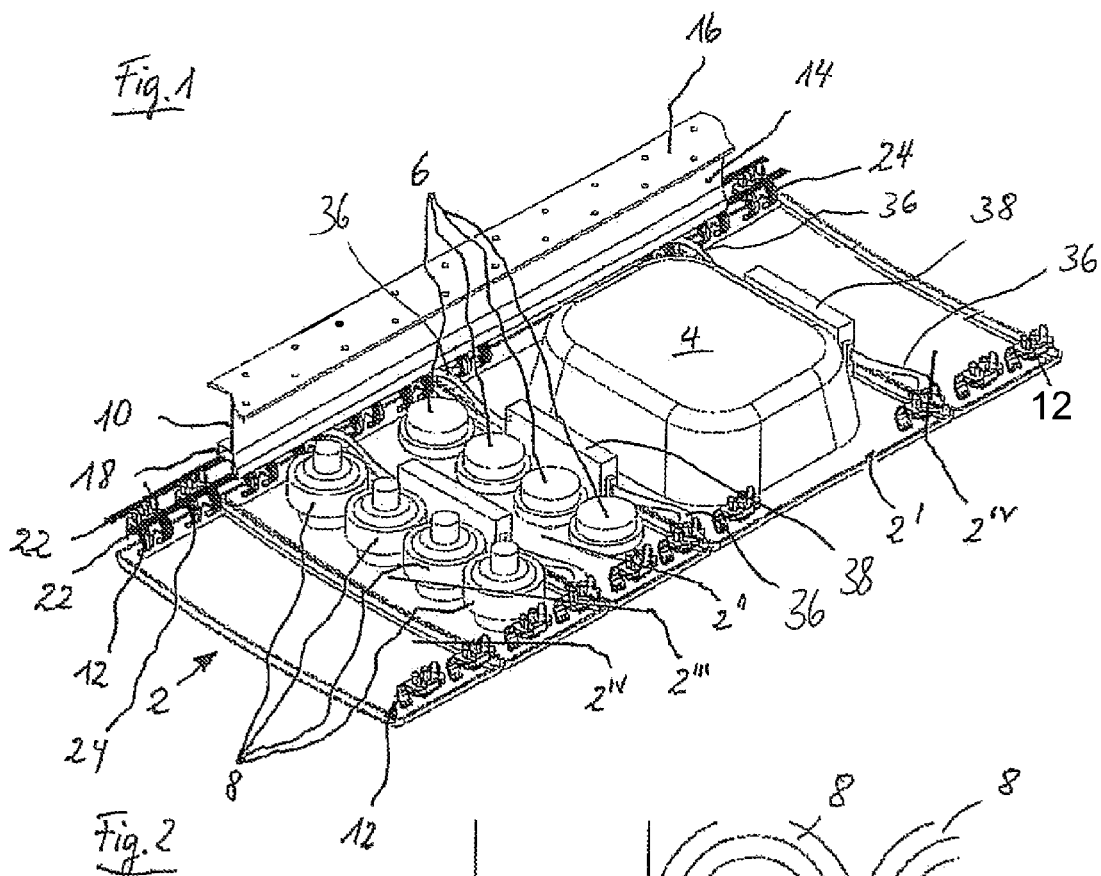
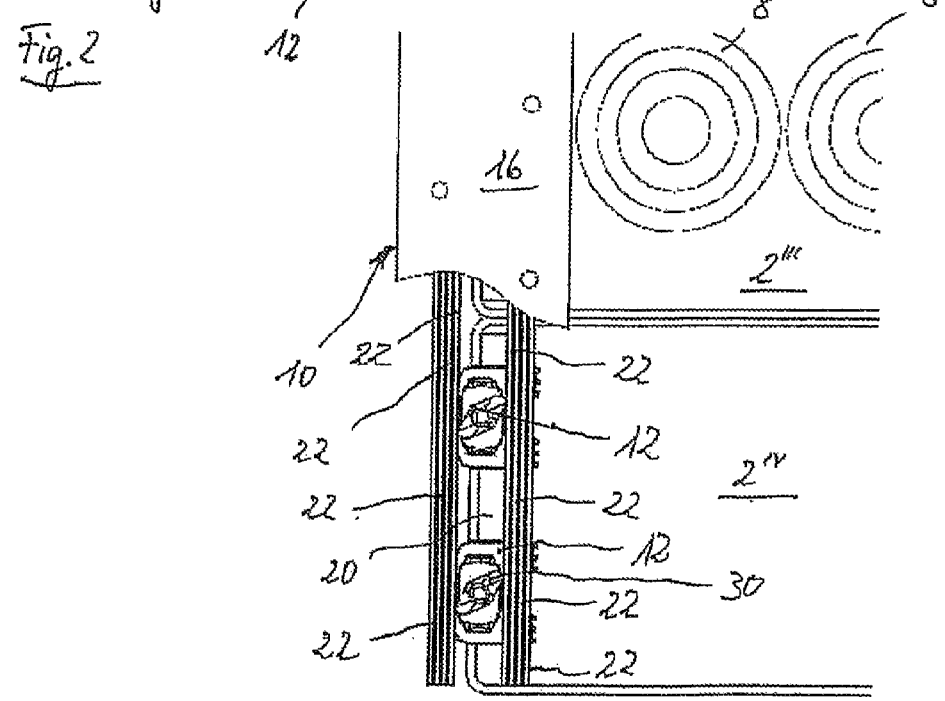

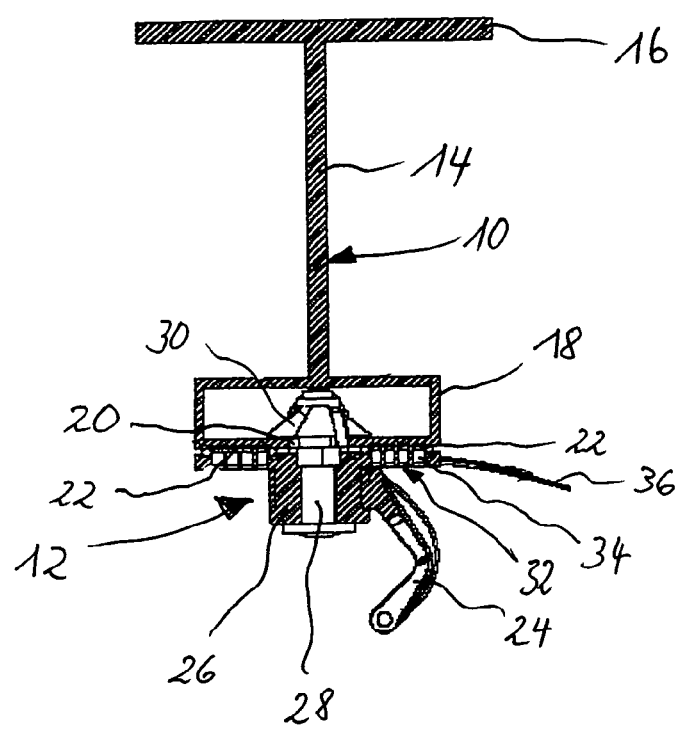

ARRANGEMENT OF AT LEAST ONE PERSONAL SERVICE UNIT IN A VEHICLE

CROSS REFERENCE TO RELATED APPLICATIONS

This application is a United States National Phase application of International Application PCT/EP2007/011310 and claims the benefit of priority under 35 U.S.C. §119 of German Patent Application DE 10 2006 061 455.0 filed Dec. 23, 2006, the entire contents of which are incorporated herein by reference.

FIELD OF THE INVENTION

The invention relates to the arrangement of at least one personal service unit in a vehicle.

BACKGROUND OF THE INVENTION

In vehicles such as buses and in particularly aircraft, usually personal service units are attached above the passenger seats, in which e.g. devices such as reading lights, loudspeakers, entertainment units as well as means for the supply of fresh air may be arranged. Personal service units applied in passenger aircraft typically also contain oxygen emergency supply devices for the passengers.

The energy supply of these devices arranged in the personal service units, as well as the transfer of control signals to these personal service units or to the devices arranged there, is effected via cables, which as a rule are arranged in ceiling-side supply channels of the vehicles concerned. The applied cables comprise a multitude of cable branches to the respective personal service units, at whose ends plug connectors are provided for the connection of the devices arranged in the personal service units. The manufacture of the necessary cable looms and the connection of the cables to the devices arranged in the personal service units, entail a significant effort. This also applies to the laying of the cable lines in the respective supply channels of the vehicle.

SUMMARY OF THE INVENTION

Against this background, it is the object of the invention to provide an arrangement of a personal service unit in a vehicle, which permits a simpler assembly of the personal service unit in the vehicle.

According to the invention, this object is achieved by an arrangement of a personal service unit in a vehicle, wherein at least one rail is arranged on the vehicle side, the rail comprising at least one lead. The personal service unit comprises at least one electricity collector which is arranged in a manner such that it conductively contacts the at least one lead of the rail in the installed condition of the personal service unit in the vehicle.

The invention envisages an arrangement of at least one, however typically a multitude of personal service units in a vehicle, with which at least one rail is arranged on the vehicle side, the rail comprising at least one lead. At least one electricity collector is provided in the respective personal service unit, and this collector is arranged in a manner such that it conductively contacts the at least one lead of the rail in the assembled condition of the personal service unit.

The arrangement according to the invention is for example intended for the use in non-subdivided passenger compartments in trains, in passenger regions of overland buses, as well as in particular for the use in passenger cabins of aircraft, thus for passenger spaces, in which a multitude of passenger seats are arranged behind and/or next to one another. With regard to these passenger spaces, at least one and preferably two rails is or are arranged in at least one supply channel provided there, preferably in the region of the ceiling of the passenger cabin. This supply channel typically also serves for receiving the personal service unit.

An electrical lead connection from an energy supply device of the vehicle, which as a rule is central, to at least one, preferably to a multitude of personal service units is created by way of the rail. For this purpose, the rail comprises at least one, typically two or more leads, which is/are directly or indirectly connected to the energy supply device of the vehicle.

The electricity collector or collectors of the respective personal service unit are connected by lead to the electrically actuated devices provided in the personal service unit. It may e.g. be designed as a sliding contact or spring contact and is arranged in the personal service unit in a manner such that on its assembly in the passenger space, it is pressed with a positive fit in conductive contact against the lead arranged in or on the rail. In a corresponding manner, the lead provided in or on the rail is arranged in a manner such that it forms at least one bare contact surface for the electricity collector or collectors. In order to protect the contact region of the electricity collector and lead from corrosion for example, preferably sealing means are provided on the electricity collector, which hermetically seal this contact region with respect to the surroundings.

Designed in such a manner, the arrangement according to the invention permits the arrangement of a personal service unit or a multitude of personal service units in a vehicle and preferably in a supply channel provided in this vehicle, at almost any location. Accordingly, the arrangement according to the invention, compared to the previous state of the art, permits a significant increase in the flexibility with regard to the design or the later redesign of a passenger space. A later conversion of an aircraft, with which a passenger cabin is to be converted from business passenger use for tourist class use, is to be mentioned in this context as an example.

A further significant advantage of the invention is the significantly reduced assembly effort compared to that which has been known until now. This applies to the creation of a conduit connection from a central energy supply to one or more of the personal service units, as well as also for fastening the personal service units in the vehicle. Compared to the previously required preparation and laying of a cable loom, the attachment of the rail replacing this cable loom entails a significant saving in time and thus costs. The same applies to the attachment of the personal service units, since these, with the arrangement according to the invention, from now on, only need to be fixed on the respective installation location in a mechanical manner, wherein the required electrical contacts are automatically created as a result of the positions of the strip conductor and electricity collectors which correspond in the installation position.

Usefully, the rails arranged on the vehicle side not only serve for the energy supply of the personal service units, but also for the signal transmission to and from the personal service units. For this, the rail in an advantageous further formation of the arrangement according to the invention, apart from the typically several leads for the energy supply of the personal service unit, comprises a further, typically several leads for signal transmission to or from the personal service unit.

With this design, one or more electricity collectors may be provided on a personal service unit, which create an electrically conductive contact to one or more leads for the energy supply, wherein one or more additional electricity collectors may be provided, which contact the leads arranged on or in the rail, for leading signals. Apart from this design, it is also possible to design an electricity collector for example in a manner such that it simultaneously contacts the lead or leads provided for the energy supply, as well as the lead or leads provided for signal transmission.

Basically, the control signals to and/or from the signal-processing devices of the personal service unit may also be modulated upon a lead provided for the electricity supply. Accordingly, according to a further advantageous design of the arrangement according to the invention, one envisages the at least one lead which is arranged on or in the rail being provided for the energy supply as well as for signal transmission from and/or to the personal service unit.

In a further advantageous design, one envisages transmitting the control signals to and/or from the signal-processing devices of the personal service unit in a wireless manner. For this, usefully in each case at least one device for transmitting and/or receiving radio signals is provided in the personal service units. These devices for sending and/or receiving radio signals may be signal-connected in a direct or indirect manner to the signal-processing devices of the personal service units, and communicate with a control device provided on the vehicle side, via a radio network, e.g. a wireless local area network (WLAN), installed in the vehicle.

The rail preferably forms a part of a data bus system of the vehicle, in order to permit a flexible arrangement of the personal service units or its simple repositioning along a rail, wherein certain sections of the rail are assigned to certain data bus addresses.

With this design, the selection of the applied data bus system, e.g. of a 4-bit data bus system or of an 8-bit data bus system, determines the number of leads on the rail which are provided for signal transmission, wherein however it is also possible to modulate the control signals of several activatable devices or control devices, which are arranged in the personal service unit, upon the leads of the rails, which are provided for signal transmission.

Preferably, data bus control electronics are arranged in the personal service unit, which on the one hand communicate via the electricity collector or collectors as well as the vehicle-side signal leads, with the vehicle-side control devices, and on the other hand with the activatable devices and/or control devices of the personal service unit, and assign the respective control signals to the individual devices.

In order to be able to assign the sending and receiving of data signals to certain personal service units and thus to certain passenger seats, the rail is advantageously divided into sections, wherein different data bus addresses are assigned to all sections. Accordingly, the individual rail sections form addressed node points of the data bus system, which via the electricity collectors also characterize the personal service units connected to this node or in this section. On assembly of a personal service unit, it is merely necessary to address this personal service unit with regard to the rail section located there.

In a particularly advantageous further formation of the arrangement according to the invention, the at least one rail is also designed for fastening a personal service unit. Accordingly, a rail is provided in the vehicle, which serves for fastening the personal service unit, but simultaneously supplies this personal service unit with electricity and, as the case may be, with control signals. The assembly effort is further reduced by way of this, since no further fastening means need to be attached on the vehicle side, for fixing the personal service unit.

Preferably, fastening means are provided on the personal service unit, with which the personal service unit may be fastened in the vehicle and in particular may be fastened on the rail which is provided there, wherein these fastening means simultaneously form at least one electricity collector. Thereby, the part of the fastening means which forms the at least one electricity collector, is usefully arranged in a manner such that after the fastening of the personal service unit, it conductively contacts the lead or leads arranged on the rail.

With this design, the rail may advantageously be designed as a hollow rail, wherein on its side facing the personal service unit, it may comprise a slot for receiving the fastening means of the personal service unit. Hereby, a rectangular hollow profile of the rail is preferred, wherein the hollow profile preferably on the side surface facing the personal service unit, comprises a slot in the longitudinal direction of the rail, which forms an access to the hollow space of the hollow profile. The lead or leads of the rail may preferably be arranged laterally of the slot on this slotted side surface of the rail, which faces the personal service unit.

The part of the fastening means which may be introduced into the slot of the rail is preferably designed in a peg-like manner and advantageously has a width which corresponds to the slot width, i.e. the width of this part of the fastening means which may be introduced into the slot is usefully slightly narrower than the slot formed on the rail. Usefully, a locking element is provided in the region of the end of this peg-like part of the fastening element, and this locking element projects in a preferably T-shaped manner at diametrical distanced sides of the peg-like part and by way of rotating this part, may be moved such that it engages behind the inner wall of the hollow profile of the rail, said inner wall delimiting the slot, by which means the fastening means is fixed on the rail with a positive fit.

According to a further advantageous design, the personal service unit is constructed in a modular manner. Accordingly, the personal service unit consists of several parts, wherein usefully, certain devices of the personal service unit are arranged on each of these parts. Thus e.g. the loudspeakers may be arranged on one of the modules, whereas another module is only equipped with means for the supply of fresh air. Apart from this, also such modules of the personal service unit are conceivable, which merely form a part of the ceiling trim of the vehicle, wherein no devices whatsoever are provided on these modules. Accordingly, no electricity collectors are necessary with the last mentioned modules.

It is particularly the case when the arrangement according to the invention is to be provided for a passenger aircraft, that the personal service unit advantageously comprises a decentral oxygen supply system and further advantageously a decentral ventilation system. Accordingly, it is not necessary in the aircraft, to apply a network of supply leads for an emergency oxygen supply. In a similar manner, one may also make do without a conduit network for the supply of fresh air. With this design, each of the personal service units may contain an autarkic oxygen source, e.g. in the form of a chemical oxygen generator or compressed oxygen storage device, wherein these devices, in an emergency situation, may receive a suitable control signal from a central location in the aircraft via the rail and the electricity collector arranged on the personal service unit, and this control signal activates the devices. The personal service units may for example comprise small fans for ventilating the individual passenger seats.

The invention is described hereinafter by way of one embodiment example represented in the drawing. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a perspective cut-out of the arrangement according to the invention;

FIG. 2 is a part of the arrangement according to FIG. 1 in a plan view; and

FIG. 3 is a cross section of a rail with an electricity collector assembled thereon.

DESCRIPTION OF THE PREFERRED EMBODIMENTS

Referring to the drawings in particular, FIG. 1 shows a personal service unit 2, as is applied in passenger aircraft. This personal service unit 2 is constructed in a modular manner and consists of four modules 2', 2'', 2''' and $2^{IV}$. All modules 2', 2'', 2''' and $2^{IV}$ as cover plates, form a part of the ceiling trim of the vehicle cabin below a supply channel arranged on the aircraft ceiling. Next to this, the service devices typically provided in personal service units 2 of aircrafts are arranged in the modules 2', 2'', 2''' and $2^{IV}$. Thus the largest module 2' in a rear-side, box-like extension 4 carries the passenger oxygen mask of a emergency oxygen device. Four illumination devices 6 are arranged on the module 2'' arranged next to this, whilst the module 2''' carries four fresh air fans 8. The modules 2', 2'' as well as 2''' are framed by two modules $2^{IV}$ which carry no devices whatsoever and merely serve for the ceiling trim.

The personal service unit is fastened on two rails 10 in the region of their longitudinal sides, wherein only one of these rails 10 is represented in FIG. 1 for the purpose of a better overview. Fastening components 12 are provided as fastening means for fixing the personal service unit 2 on the rails 10, and these fastening components are arranged on the modules 2' to $2^{IV}$ in each case at the side edges, which form the longitudinal sides of the personal service unit 2. Thereby, in each case two fastening components 12 are arranged on each of the modules 2' to $2^{IV}$ at the two just mentioned side edges.

As may be deduced from FIGS. 1 and 3, the rails 10 comprise an essentially double T-profile, wherein in each case a flange 16 arranged transversely to the web 14, and a flange 18, is arranged on the longitudinal edges of a web 14. The flange 16 is designed as a flat strip and serves for fastening the rail 10 in a supply channel arranged on the aircraft side, in the region of the cabin roof. The flange 18 comprises a rectangularly designed hollow profile. A slot 20 is provided on the side of the flange 16, which is distant to the flange 16 or proximal to the personal service unit 2, and this slot extends in the longitudinal direction of the rail 10.

In each case, 4 leads 22 are arranged at both sides of the slot 20 on the side surfaces of the flange 18 which face the personal service unit 2. One of these leads 22 serves for the energy supply of the oxygen supply device 4, the illumination devices 6, as well as the fresh air fan 8. This lead 22 is connected to a central energy supply of the aircraft which is not represented in the figures. The remaining leads 22 serve for transmitting control signals from or to the devices arranged in the personal service unit 2 and form part of a data bus system of the aircraft.

The fastening components 12 in each case comprise two holding arms 24, which are attached on the modules 2' to $2^{IV}$ on their rear side, which is not visible in the installed condition, in the region of the longitudinal edges, standing parallel to one another. The respective two holding arms 24 of a fastening component 12 connect a base body 26 at their ends which are distanced to the modules 2' to $2^{IV}$. This base body 26 comprises a bore which serves for the rotationally movable mounting of a peg 28. The peg 28 thereby projects out at the side of the base body 26, which is distanced to the rear side of the respective module. A locking element 30 is arranged at the end of the peg 28 which projects out of the base body 26. The locking element extends transversely to the longitudinal extension of the peg 28, wherein it projects in a T-shaped manner at diametrical sides of the peg 28.

The fastening of the modules 2' to $2^{IV}$ on the rails 20 is effected by way of introducing the pegs 28 with the locking elements 30 arranged thereon, into the slot 20 formed on the flange 18 of the rail 10 and by way of subsequent rotation of the pegs 28, wherein the regions of the locking elements 30 which project laterally on the pegs 28, engage behind the inner wall of the hollow profile of the flange 18 laterally of the slots 20. By way of this, the fastening components 12 and thus the modules 2' to $2^{IV}$ are fixed on the rails 20 with a positive fit.

Apart from the fastening of the modules 2' to $2^{IV}$, the fastening components 12 comprise electricity collectors 32, with which the service devices of the modules 2' to $2^{IV}$ which are arranged on the modules 2' to $2^{IV}$, are supplied with energy as well as with control signals. The electricity collector 32 is arranged at that side of the base body 26 of the fastening components 12, which faces the flange 18 of the rail 10 in the installation position, wherein the position of the electrical contacts 34 of the electricity collector 32 corresponds to the position of the leads 22 arranged on the flange 18. The electricity collector 32 may be designed as a sliding contact or a spring contact.

In each case, data bus control electronics 38 are arranged on the modules 2', 2'' and 2''', by way of which the service units provided in each case on the modules 2', 2'' and 2''' are activated and supplied with electricity. The data bus control electronics 38 are in each case connected via a lead cable 36 to the electricity collector 32 of the fastening components 12.

While specific embodiments of the invention have been described in detail to illustrate the application of the principles of the invention, it will be understood that the invention may be embodied otherwise without departing from such principles.

The invention claimed is:

1. An arrangement of at least one personal service unit in a vehicle, the arrangement comprising:
    a rail arranged on a vehicle side, said rail comprising at least one lead;
    a personal service unit comprising at least one electricity collector arranged conductively, directly contacting the at least one lead of the rail in the installed condition of the personal service unit in the vehicle; and
    fastening means provided on the personal service unit for fastening in the vehicle, said fastening means comprising the at least one electricity collector, said fastening means comprising an arm, said arm engaging said at least one lead and said personal service unit, said fastening means being arranged between said personal service unit and said at least one lead, wherein said personal service unit is mechanically and electrically connected to said rail via said fastening means.

2. An arrangement according to claim 1, wherein the rail further comprises a further lead and said at least one lead is for energy supply of the personal service unit, and said further lead is for signal transmission to and from the personal service unit.

3. An arrangement according to claim 1, wherein the at least one lead is provided for the energy supply as well as for signal transmission, said personal service unit being located adjacent to said rail, at least a portion of said personal service unit being arranged at a position below said rail and said electricity collector.

4. An arrangement according to claim 1, wherein the personal service unit comprises at least one device for transmitting and/or receiving radio signals.

5. An arrangement according to claim 1, wherein the rail forms part of a data bus system of the vehicle, wherein certain data bus addresses are assigned to certain sections of the rail.

6. An arrangement according to claim 1, wherein the at least one rail is designed for fastening of the at least one personal service unit.

7. An arrangement according to claim 1, wherein the rail comprises a hollow rail with a slot at a side of said rail which faces the personal service unit for receiving said fastening means.

8. An arrangement according to claim 7, wherein the fastening means comprises a locking element which is movable in the rail, into a position engaging behind the slot.

9. An arrangement according to claim 1, wherein the personal service unit is constructed in a modular manner.

10. An arrangement according to claim 1, wherein sealing means are provided, which seal the contact region of the electricity collector and lead with respect to the surroundings.

11. An arrangement according to claim 1, wherein the personal service unit has a decentral oxygen supply system.

12. An arrangement according to claim 1, wherein the personal service unit has a decentral ventilation system.

13. A vehicle and personal service unit arrangement comprising:
   a vehicle;
   a rail connected to the vehicle, said rail comprising a lead;
   a personal service unit comprising an electricity collector arranged conductively contacting said lead, wherein said electricity collector directly engages said lead, said electricity collector being arranged between one end of said rail and said personal service, wherein said electricity collector is located at a position above said personal service unit, at least one portion of said personal service unit being located adjacent to said electricity collector; and
   fastening means provided on the personal service unit for fastening in the vehicle, said fastening means comprising the electricity collector, said fastening means comprising an arm, said arm engaging said lead and said personal service unit, said fastening means being arranged between said personal service unit and said lead, wherein said personal service unit is mechanically and electrically connected to said rail via said fastening means.

14. An arrangement according to claim 13, wherein the rail further comprises a further lead for signal transmission to and from the personal service unit and said lead is for supplying energy to the personal service unit.

15. An arrangement according to claim 13, wherein said lead is for both supplying energy to the personal service unit as well as for signal transmission to and from the personal service unit, said electricity collector comprising one of a sliding contact and a spring contact, said one of said sliding contact and said spring contact being arranged in said personal service unit, said personal service unit being connected to said rail such that said one of sliding contact and said spring contact is pressed in direct conductive contact against said lead of said rail.

16. An arrangement according to claim 13, wherein the personal service unit comprises a device for transmitting and/or receiving radio signals.

17. An arrangement according to claim 13, wherein the rail forms part of a data bus system of the vehicle, wherein certain data bus addresses are assigned to certain sections of the rail.

18. An arrangement according to claim 13, wherein the rail comprises a hollow rail with a slot at a side of said rail which faces the personal service unit, said slot for receiving said fastening means.

19. An arrangement according to claim 1, wherein said electricity collector comprises one of a sliding contact and a spring contact, said one of said sliding contact and said spring contact being arranged in said personal service unit such that said one of sliding contact and said spring contact is pressed in direct conductive contact against said lead of said rail.

* * * * *